United States Patent
Jeon

(10) Patent No.: US 9,411,705 B2
(45) Date of Patent: Aug. 9, 2016

(54) EVENT COMMUNICATION APPARATUS FOR PROTECTION RELAY

(71) Applicant: LSIS CO., LTD., Anyang-si, Gyeonggi-do (KR)

(72) Inventor: Byung Joon Jeon, Cheongju-si (KR)

(73) Assignee: LSIS CO., LTD., Anyang-si (KR)

( * ) Notice: Subject to any disclaimer, the term of this patent is extended or adjusted under 35 U.S.C. 154(b) by 77 days.

(21) Appl. No.: 14/465,087

(22) Filed: Aug. 21, 2014

(65) Prior Publication Data

US 2015/0067408 A1 Mar. 5, 2015

(30) Foreign Application Priority Data

Sep. 2, 2013 (KR) .................... 10-2013-0105035

(51) Int. Cl.
*G06F 11/00* (2006.01)
*G06F 11/34* (2006.01)
(Continued)

(52) U.S. Cl.
CPC ............ *G06F 11/3409* (2013.01); *G06F 9/542* (2013.01); *G06F 11/0766* (2013.01); *G06F 11/0781* (2013.01); *H01H 71/00* (2013.01); *H01H 2071/006* (2013.01)

(58) Field of Classification Search
CPC ............ G06F 11/3409; G06F 11/0766; G06F 11/0781; G06F 11/3065; G06F 9/542
See application file for complete search history.

(56) References Cited

U.S. PATENT DOCUMENTS 7,921,199 B1* 4/2011 Shirriff ............... G06F 11/3006
709/220

2004/0225381 A1* 11/2004 Ritz .................... G06F 11/0709
700/26

(Continued)

FOREIGN PATENT DOCUMENTS

IN WO 2012098558 A1 * 7/2012 .......... G06F 11/3006
JP 2002-345144 11/2002

(Continued)

OTHER PUBLICATIONS

European Patent Office Application Serial No. 14181726.2, Search Report dated Feb. 3, 2015, 6 pages.

(Continued)

*Primary Examiner* — Yolanda L Wilson
(74) *Attorney, Agent, or Firm* — Lee Hong Degerman Kang & Waimey; Jonathan Kang; Jeffrey Lotspeich

(57) ABSTRACT

Disclosed is an event communication apparatus for a protection relay, which effectively simplifies an event determination operation by a main processing module and a communication module, thereby enhancing updating. The event communication apparatus for the protection relay includes a shared memory configured to store and provide data needed to share, a main processing module configured to, whenever an event occurs, update previous event data to a status information of the event and a status occurrence time information as new event data, and write the updated event data into the shared memory, and a communication module configured to periodically read status information from the shared memory, compare the read status information with pre-stored previous status information to determine whether there is a status change, determine occurrence of a new event when there is the status change, and transmit corresponding event data to an supervisory monitor immediately when the new event occurs.

5 Claims, 4 Drawing Sheets

(51) Int. Cl.
*G06F 11/07* (2006.01)
*H01H 71/00* (2006.01)
*G06F 9/54* (2006.01)

(56) References Cited

U.S. PATENT DOCUMENTS

| | | | |
|---|---|---|---|
| 2006/0119344 A1 | 6/2006 | Benke et al. | |
| 2011/0078513 A1* | 3/2011 | Beattie, Jr. | G06F 1/20 714/47.2 |
| 2013/0097272 A1* | 4/2013 | Atkins | G06F 11/0709 709/207 |
| 2013/0268812 A1* | 10/2013 | Liu | G05B 13/02 714/57 |
| 2014/0006398 A1* | 1/2014 | Johnson | H04L 65/602 707/736 |

FOREIGN PATENT DOCUMENTS

| | | |
|---|---|---|
| JP | 2012-249340 | 12/2012 |
| KR | 10-1212214 | 12/2012 |
| KR | 10-2013-0047465 | 5/2013 |
| KR | 10-2013-0071746 | 7/2013 |
| WO | 2004/061462 | 7/2004 |

OTHER PUBLICATIONS

Korean Intellectual Property Office Application Serial No. 10-2013-0105035, Office Action dated Mar. 28, 2015, 5 pages.
Suh, et al., "A Study on Design of Digital Protective Relay for Transformer Using a DSP," Journal of KIIEE, vol. 17, No. 6, Nov. 2003, pp. 39-46.
Korean Intellectual Property Office Application Serial No. 10-2013-0105035, Office Action dated Sep. 30, 2014, 4 pages.

* cited by examiner

EVENT COMMUNICATION APPARATUS FOR PROTECTION RELAY

CROSS-REFERENCE TO RELATED APPLICATION

Pursuant to 35 U.S.C. §119(a), this application claims the benefit of earlier filing date and right of priority to Korean Application No. 10-2013-0105035, filed on Sep. 2, 2013, the contents of which are all hereby incorporated by reference herein in its entirety.

BACKGROUND OF THE DISCLOSURE

1. Field of the Disclosure

The present disclosure relates to a protection relay, and particularly, to an event communication apparatus for a protection relay.

2. Background of the Disclosure

Protection relays are relays that have a function of measuring amounts of voltage, current, and power of an electric power distribution line and a function of detecting a fault state of a protection target, in addition to a basic relay function. Among such protection relays, a protection relay having a remote communication function is connected to an supervisory monitor through a communication line, and periodically transmits information (in other words data) of the protection relay to the supervisory monitor according to an industrial communication protocol.

In other words, when event information such as a measurement value of amounts of voltage, current, and electric power, status information such as a fault status, an external contact status signal input, a contact control output based on a predetermined sequence, or information about an operation of a protection target is updated, the protection relay having the remote communication function may form a response communication frame to transmit the response communication frame in response to a periodic transmission request of the supervisory monitor.

Moreover, in communication using an industrial communication protocol having a data anti-collision function, event information may be automatically transmitted to the supervisory monitor even without a transmission request of the supervisory monitor.

A configuration of an event communication apparatus for a protection relay of the related art will be described with reference to FIGS. 1 to 3.

First, a configuration of a related art protection relay will now be described with reference to FIG. 1 that is a block diagram illustrating the configuration of the related art protection relay.

A related art protection relay 100 includes an converting module 30, a communication module 20, a digital input/output module 40, an interface module 50, and a main processing module 10.

The converting module 30 is a module that senses a voltage and current of a relay line, and converts an amount of electricity into data.

The communication module 20 is a module that communicates with an supervisory monitor.

The digital input/output module 40 is a module that receives a contact status signal to output a digital output signal to an external device such as circuit breaker.

The interface module 50 is a screen display module that externally displays a sensing value of the voltage and current of the relay line, which is supplied from the converting module 30, or information about a contact status.

The main processing module 10 is a module that is connected to the converting module 30, the communication module 20, the digital input/output module 40, and the interface module 50, collects data from the modules 30, 20, 40, 50, and controls an operation of the modules.

The main processing module 10 and the other modules are connected to each other through a bus, and exchange information through communication.

A configuration and operation of a related art event communication apparatus in the protection relay 100 will be described with reference to FIGS. 2 and 3.

Referring to FIG. 2, the related art event communication apparatus in the protection relay 100 includes a main processing module 10, a shared memory 60, and a communication module 20.

The related art event communication apparatus further includes the shared memory 60, in addition to the above-described main processing module 10 and communication module 20.

The shared memory 60 is a memory that is shared by the main processing module 10 and the communication module 20. The shared memory 60 is used for that the communication module 20 requests event data by using the shared memory 60, the main processing module 10 writes the event data into the shared memory 60 in response to the request, and the communication module 20 again reads out the event data from the shared memory 60 to transmit the read event data to the supervisory monitor 200 to report to the supervisory monitor 200.

As seen in FIG. 3, at the step S1, the communication module 20 writes an event data-requesting message into the shared memory 60 to request event data to the main processing module 10.

Then, the main processing module reads out the event data-requesting message from the shared memory 60, and writes event data into the shared memory 60 to respond to the event data request (step S2).

And then, the communication module 20 reads out the event data from the shared memory 60, and determines event data by leaving event data needed to report to the supervisory monitor 200 (step S3).

Subsequently, at the step S4, the communication module 20 determines whether the event data is the event data needed to report to the supervisory monitor 200 or not.

When it is determined that the event data is the event data needed to report to the supervisory monitor 200, an operation proceeds to the step S5. On the other hand, when it is determined that the event data is needless event data instead of the event data needed to report to the supervisory monitor 200, an operation returns to the step S1.

Subsequently, at the step S5, the communication module 20 stores the event data, needed to report to the supervisory monitor 200, in an upper stream transmission event buffer (not shown) included in the communication module 20.

Subsequently, at the step S6, the communication module 20 transmits the event data from the upper stream transmission event buffer to the supervisory monitor 200.

As a result, the operation of the related art event communication apparatus is ended.

In the related art event communication apparatus, a time taken until the main processing module 10 writes event data into the shared memory 60 in response to an event data request of the communication module 20 may be delayed. In particular, as the number of event data increases, a time taken until the main processing module 10 writes all the event data into the shared memory 60 may be delayed. Since the main processing module 10 should communicate with the interface module 50 and the converting module 30 in addition to a corresponding response, time delay occurs in responding to event data requested by the communication module 20 according to a work priority of the main processing module 10.

In terms of the communication module 20, when low-priority communication with the supervisory monitor 200 and high-priority determination (the above-described the step S3) of an event are performed at the same time, the low-priority communication with the supervisory monitor 200 is delayed until a high-priority operation of determining the event is ended, and for this reason, a data communication speed between the communication module 20 and the supervisory monitor 200 can be slower. On the other hand, when a priority of an event determination operation by the main processing module 10 and the communication module 20 is lower than that of communication with the supervisory monitor 200, the data communication speed between the communication module 20 and the supervisory monitor 200 can be satisfied, but an updating of event data can be worse.

Therefore, a method for effectively simplifying an event determination operation by the main processing module 10 and the communication module 20 is needed.

SUMMARY OF THE DISCLOSURE

Therefore, an object of the this disclosure is to provide an event communication apparatus for a protection relay, which effectively simplifies an event determination operation by a main processing module and a communication module, thereby enhancing updating.

To achieve these and other advantages and in accordance with the object of this disclosure, an event communication apparatus for a protection relay according to this disclosure which transmits event data to a supervisory monitor, the event communication apparatus comprising:

a shared memory configured to store and provide data to share;

a main processing module configured to, whenever an event occurs, update previous event data to a status information of the event and a status occurrence time information as new event data, and write the updated event data into the shared memory; and a communication module configured to periodically read status information from the shared memory, compare the read status information with pre-stored previous status information to determine whether there is a status change, determine occurrence of a new event when there is the status change, and transmit corresponding event data to the supervisory monitor immediately when the new event occurs.

According to one aspect of this disclosure, the communication module comprises an event buffer configured to store status information and status occurrence time information as event data about the new event.

According to another aspect of this disclosure, when the event data stored in the event buffer is updated to new event data, the communication module is configured to transmit the updated event data immediately to the supervisory monitor.

According to still another aspect of this disclosure, the communication module comprises a priority setting information storage unit in which a priority of an operation of periodically reading the shared memory is set higher than priorities of other operations.

According to still another aspect of this disclosure, the main processing module comprises a priority setting information storage unit in which a priority of an operation of writing event data in the shared memory immediately whenever the event data occurs is set higher than priorities of other operations.

Further scope of applicability of the present application will become more apparent from the detailed description given hereinafter. However, it should be understood that the detailed description and specific examples, while indicating preferred embodiments of the disclosure, are given by way of illustration only, since various changes and modifications within the spirit and scope of the disclosure will become apparent to those skilled in the art from the detailed description.

BRIEF DESCRIPTION OF THE DRAWINGS

The accompanying drawings, which are included to provide a further understanding of the disclosure and are incorporated in and constitute a part of this disclosure, illustrate exemplary embodiments and together with the description serve to explain the principles of the disclosure.

In the drawings.

DETAILED DESCRIPTION OF THE DISCLOSURE

Description will now be given in detail of the exemplary embodiments, with reference to the accompanying drawings. For the sake of brief description with reference to the drawings, the same or equivalent components will be provided with the same reference numbers, and description thereof will not be repeated.

Figure 4:
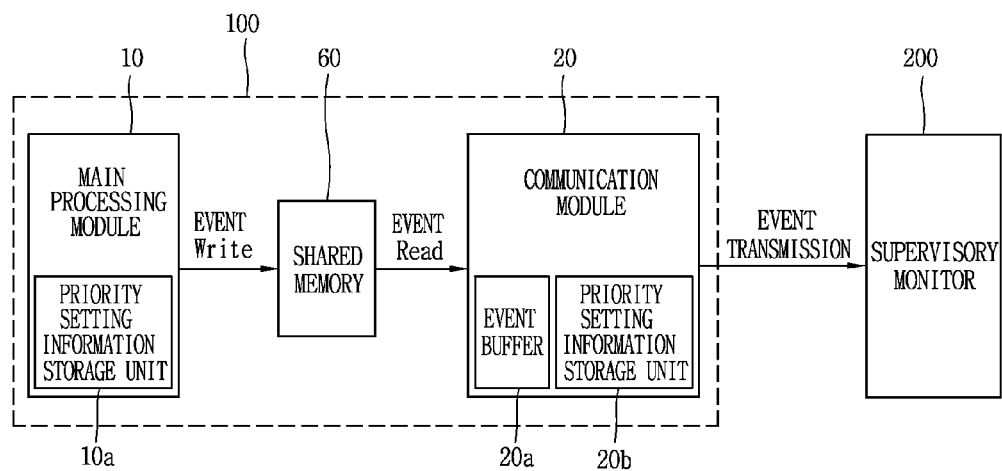
FIG. 4 is a block diagram illustrating a configuration of an event communication apparatus for a protection relay according to an embodiment of the present invention.

First, an event communication apparatus for a protection relay according to an embodiment of the present invention will be described in detail with reference to FIG. 4 that is a functional block diagram illustrating a configuration of the event communication apparatus for the protection relay according to an embodiment of the present invention.

An event communication apparatus for a protection relay 100 according to an embodiment of the present invention is an apparatus that transmits event data to an supervisory monitor 200, and comprises a shared memory 60, a main processing module 10, and a communication module 20.

The shared memory 60 is a memory that stores and provides data which is to be shared by the main processing module 10 and the communication module 20, and is connected to the main processing module 10 and the communication module 20 through, for example, a bus.

Figure 1:
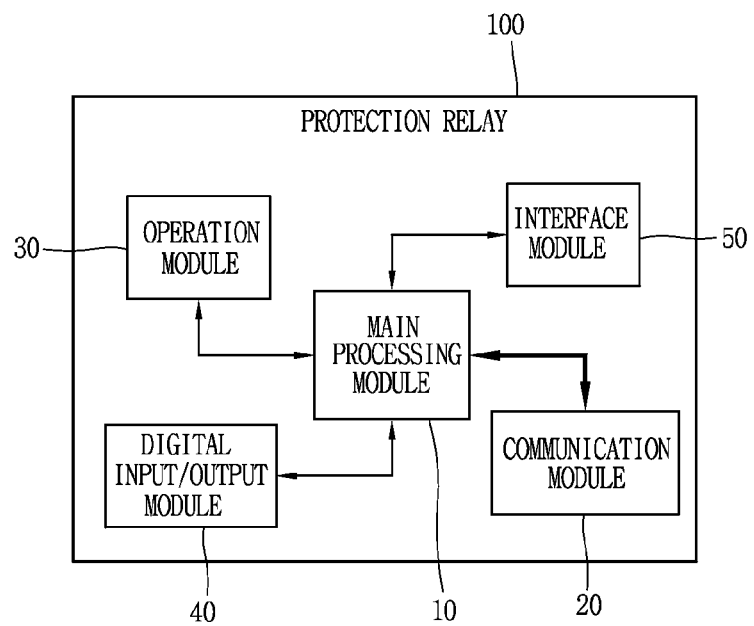
FIG. 1 is a block diagram illustrating a configuration of a protection relay according to related art.
Figure 2:
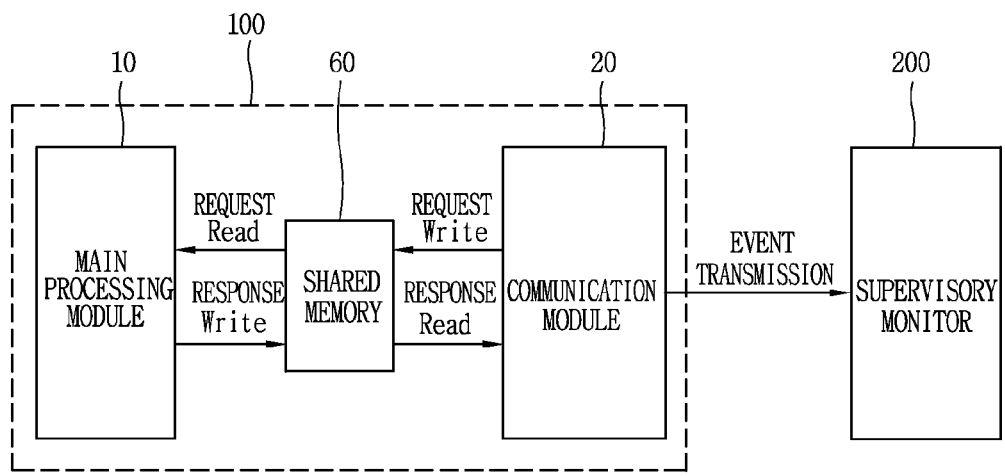
FIG. 2 is a block diagram illustrating a configuration of an event communication apparatus for a protection relay according to the related art.
Figure 3:
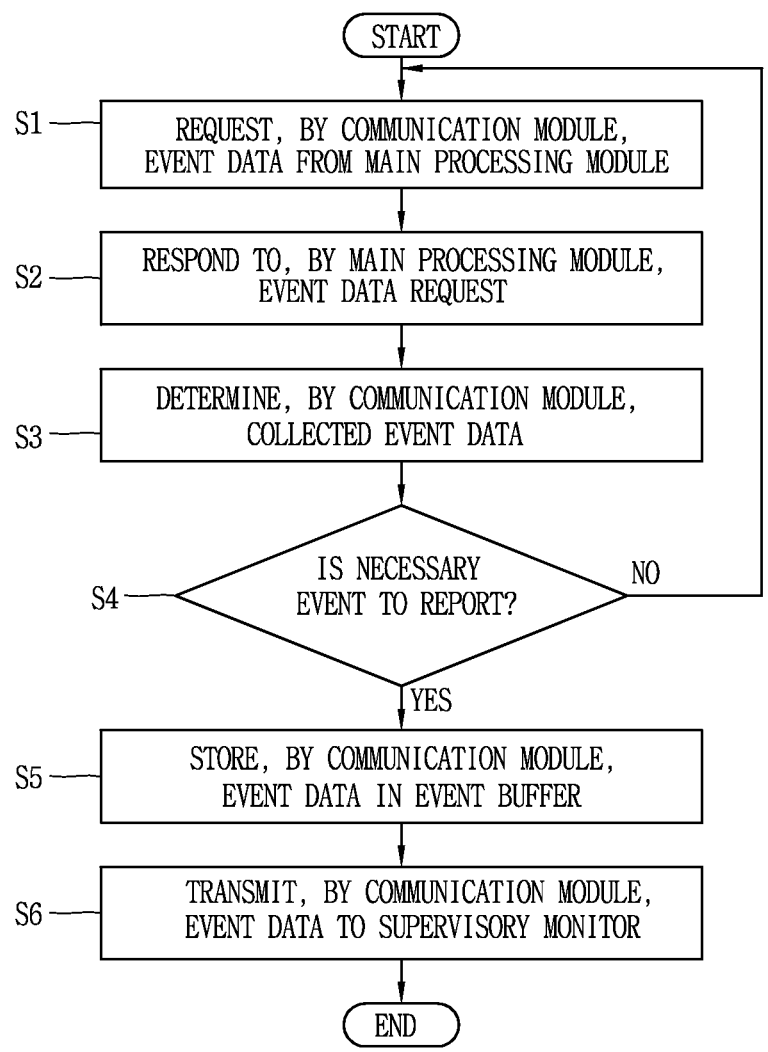
FIG. 3 is a flowchart illustrating a request and response operation of event data in the protection relay and an operation of transmitting data from the protection relay to an supervisory monitor, in the event communication apparatus for the protection relay of the related art.

As described above with reference to FIG. 1, the main processing module 10 is connected to the converting module 30, the communication module 20, the digital input/output module 40, and the interface module 50, collects data from those modules 30, 20, 40, 50, and controls an operation of those modules 30, 20, 40, 50.

According to a preferred aspect of the present invention, whenever an event occurs, the main processing module 10 updates the existing event data to status information of the event and status occurrence time information as new event data and writes the updated event data into the shared memory 60.

To this end, according to a preferred aspect of the present invention, the main processing module 10 may include a priority setting information storage unit 10a in which a priority of an operation of writing event data into the shared memory 60 immediately whenever the event data occurs is set higher than those of the other operations.

The communication module 20 is a module that communicates with the supervisory monitor 200.

According to a preferred another aspect of the present invention, the communication module 20 periodically reads the shared memory 60, and compares current status information and pre-stored previous status information. When it is determined that a status is changed, the communication module 20 determines that a new event occurs.

The communication module 20 may include an event buffer 20a that stores status information (in other words status data) and status occurrence time information (in other words status occurrence time data) as event data about the new event.

When the event data of the event buffer 20a is updated, the communication module 20 immediately transmits corresponding event data to the supervisory monitor 200.

According to a preferred another aspect of the present invention, the communication module 20 may include a priority setting information storage unit 20b in which a priority of an operation of periodically reading the shared memory 60 is set higher than those of the other operations.

Figure 5:
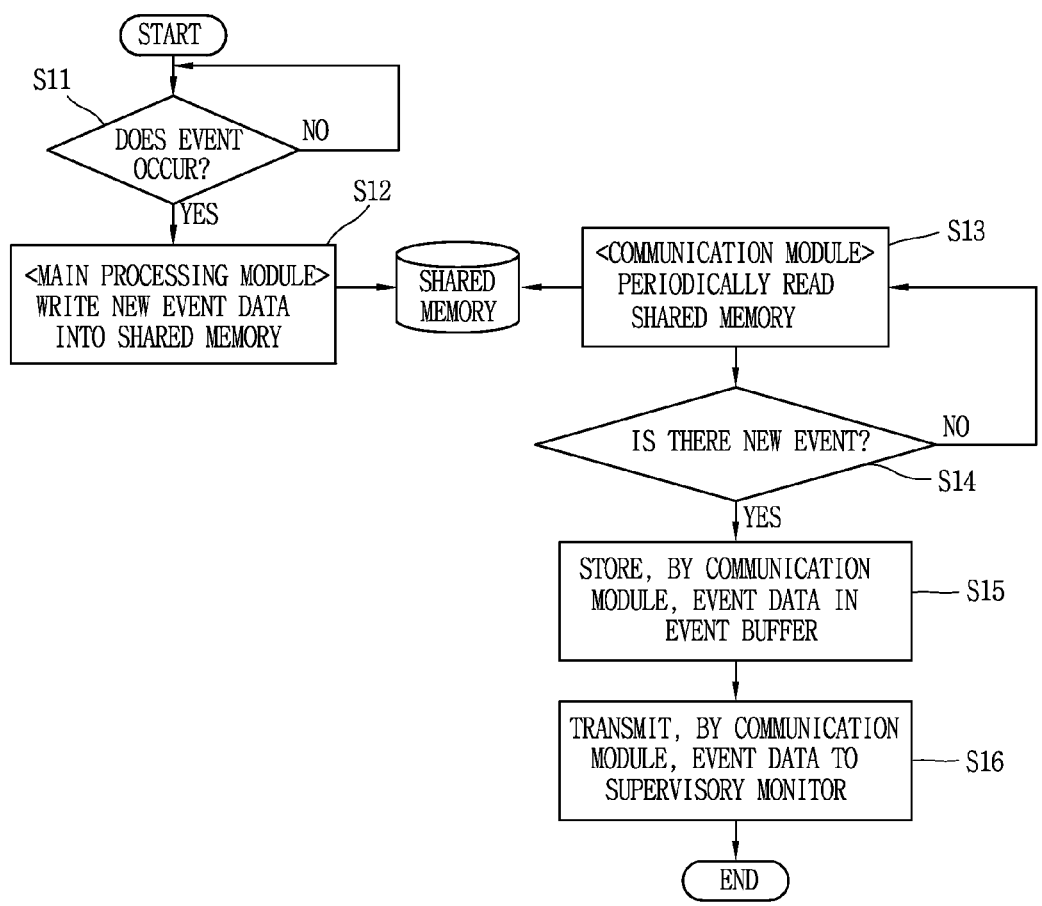
FIG. 5 is a flowchart illustrating an operation in which event data occurs in the protection relay and is transmitted to an supervisory monitor, in the event communication apparatus for the protection relay according to an embodiment of the present invention.

An operation of the event communication apparatus for the protection relay 100 according to an embodiment of the present invention will be described in detail with main reference to FIG. 5 and FIG. 4.

First, at step S11, the main processing module 10 determines whether an event occurs.

When it is determined at step S11 that the event occurs, operation according to step S12 is performed. When it is determined at step S11 that the event does not occur, the main processing module 10 again performs operation of step S11 to determine whether the event occurs.

At step S12, whenever an event occurs, the main processing module 10 updates the existing event data to status information of the event and status occurrence time information as new event data and writes the updated event data into the shared memory 60.

At step S13, the communication module 20 periodically reads out event data stored in the shared memory 60.

Subsequently, at step S14, the communication module 20 compares the event data, which is read from the shared memory 60, with previous event data stored in the event buffer 20a to determine whether the read event data is changed data (i.e., new event data).

When it is determined at step S14 that the read event data is the changed data (i.e., the new event data) which differs from the previous event data, the communication module 20 proceeds to step S15. At step S15, the communication module 20 updates the existing event data to the new event data, and stores the updated event data in the event buffer 20a.

Subsequently, at step S16, the communication module 20 immediately transmits the updated new event data, stored in the event buffer 20a, to the supervisory monitor 200.

According to a preferred aspect of the present invention, operation according to steps of S11-S16 may be automatically performed even without a request of the supervisory monitor 200.

As described above, in the event communication apparatus for the protection relay 100 according to an embodiment of the present invention, the main processing module 10 writes status information of an event and status occurrence time information into the shared memory 60 whenever the event occurs, and the communication module 20 periodically reads out event data from the shared memory 60, and compares the read event data with pre-stored previous event data to determine whether there is a change. Even when there is the change, the communication module 20 determines the read event data as new event data, and immediately transmits the new event data to the supervisory monitor 200. Accordingly, a updating of event data is enhanced, and thus, an event data of the main processing module 10 becomes the same as that of the supervisory monitor 200.

In the event communication apparatus for the protection relay 100 according to an embodiment of the present invention, a priority of an operation of periodically reading the shared memory 60 is set higher than those of the other operations in terms of the communication module 20, and thus, the updating of event data can be more enhanced.

In the event communication apparatus for the protection relay 100 according to an embodiment of the present invention, a priority of an operation of writing event data in the shared memory 60 immediately whenever the event data occurs is set higher than those of the other operations in terms of the main processing module 10, and thus, the updating of event data can be more enhanced.

In the event communication apparatus for the protection relay 100 according to an embodiment of the present invention, although there is no request of the supervisory monitor 200, when there is changed event data, the changed event data is immediately transmitted to the supervisory monitor 200, thereby enhancing network use efficiency between the protection relay 100 and the supervisory monitor 200.

The foregoing embodiments and advantages are merely exemplary and are not to be considered as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds are therefore intended to be embraced by the appended claims.

What is claimed is:

1. An event communication apparatus for a protection relay which transmits event data to a supervisory monitor, the event communication apparatus comprising:

a shared memory configured to store and provide data to share;

a main processing module configured to, whenever an event occurs, update previous event data to a status information of the event and a status occurrence time information as new event data, and write the updated event data into the shared memory; and a communication module configured to periodically read status information from the shared memory, compare the read status information with pre-stored previous status information to determine whether there is a status change, determine occurrence of a new event when there is the status change, and transmit corresponding event data to the supervisory monitor immediately when the new event occurs, wherein a priority of an operation of writing event data in the shared memory whenever the event data occurs is set higher than priorities of other operations for the main processing module, and wherein a priority of an operation of periodically reading the shared memory is set higher than priorities of other operations for the communication module.

2. The event communication apparatus of claim 1, wherein the communication module comprises an event buffer configured to store status information and status occurrence time information as event data about the new event.

3. The event communication apparatus of claim 2, wherein when the event data stored in the event buffer is updated to new event data, the communication module is configured to transmit the updated event data immediately to the supervisory monitor.

4. The event communication apparatus of claim 3, wherein the communication module comprises a priority setting information storage unit for setting the priority of the operation of periodically reading the shared memory higher than the priorities of the other operations.

5. The event communication apparatus of claim 1, wherein the main processing module comprises a priority setting information storage unit for setting the priority of the operation of writing event data in the shared memory whenever the event data occurs to higher than the priorities of the other operations.

* * * * *